Dec. 15, 1925.  
E. W. TEMPLIN  
1,565,526  
RUNNING GEAR FOR MOTOR VEHICLES  
Filed June 30, 1921     5 Sheets-Sheet 1

Dec. 15, 1925.

E. W. TEMPLIN 1,565,526

RUNNING GEAR FOR MOTOR VEHICLES

Filed June 30, 1921

Inventor
Ellis W. Templin

R. P. Trogner
Attorney

Dec. 15, 1925.  
E. W. TEMPLIN  
RUNNING GEAR FOR MOTOR VEHICLES  
Filed June 30, 1921  
1,565,526  
5 Sheets-Sheet 5

Patented Dec. 15, 1925.

1,565,526

UNITED STATES PATENT OFFICE.

ELLIS W. TEMPLIN, OF AKRON, OHIO, ASSIGNOR TO THE GOODYEAR TIRE & RUBBER COMPANY, OF AKRON, OHIO, A CORPORATION OF OHIO.

RUNNING GEAR FOR MOTOR VEHICLES.

Application filed June 30, 1921. Serial No. 481,519.

*To all whom it may concern:*

Be it known that I, ELLIS W. TEMPLIN, a citizen of the United States, residing at Akron, in the county of Summit and State of Ohio, have invented new and useful Improvements in Running Gears for Motor Vehicles, of which the following is a specification.

My invention relates to running-gears for motor vehicles, and more specifically to improvements in such mechanisms of the type embodying a plurality of live axles.

In my co-pending application, Serial No. 382,046, filed May 17th, 1920 and entitled "Running gears for motor vehicles," a running-gear is disclosed that comprises a rear driving truck provided with two resiliently suspended, live axles of the worm gear type, mechanism for neutralizing the torque effects of the axles, and simultaneously operable brake mechanisms for each wheel.

My present invention contemplates a running gear that embodies, in addition to certain basic features of construction disclosed in the aforesaid application and in subsequent divisions thereof, an improved and more comprehensive organization of mechanisms including front steering wheels and a breaking mechanism that embraces the front wheels, as well as the rear wheels, the various braking elements being co-ordinated for simultaneous control, preferably by a single lever, and arranged for simultaneous emergency application by an auxiliary control lever.

The invention is further directed toward providing a more flexible torque neutralizing mechanism, adapted for use in conjunction with an improved type of live axle, and developing a form of spring mounting for the driving truck axles, whereby provision is made for end thrust or axial movement thereof on rounding curves or under like conditions.

Other objects and advantages reside in the specific construction and aggroupment of elements peculiar to my structure, as will become apparent from a more complete examination of this specification, in the claims of which I have assembled and pointed out certain combinations of parts and specific constructions indicative of the scope and spirit of the invention.

In the drawings which illustrate a preferred embodiment of the invention.

Referring to the drawings, in which like symbols designate corresponding parts throughout each of the several views, the letter A designates the frame of my running-gear, which may be of any suitable construction, and which is supported upon a front steering truck B and a rear driving truck C.

Figure 1:
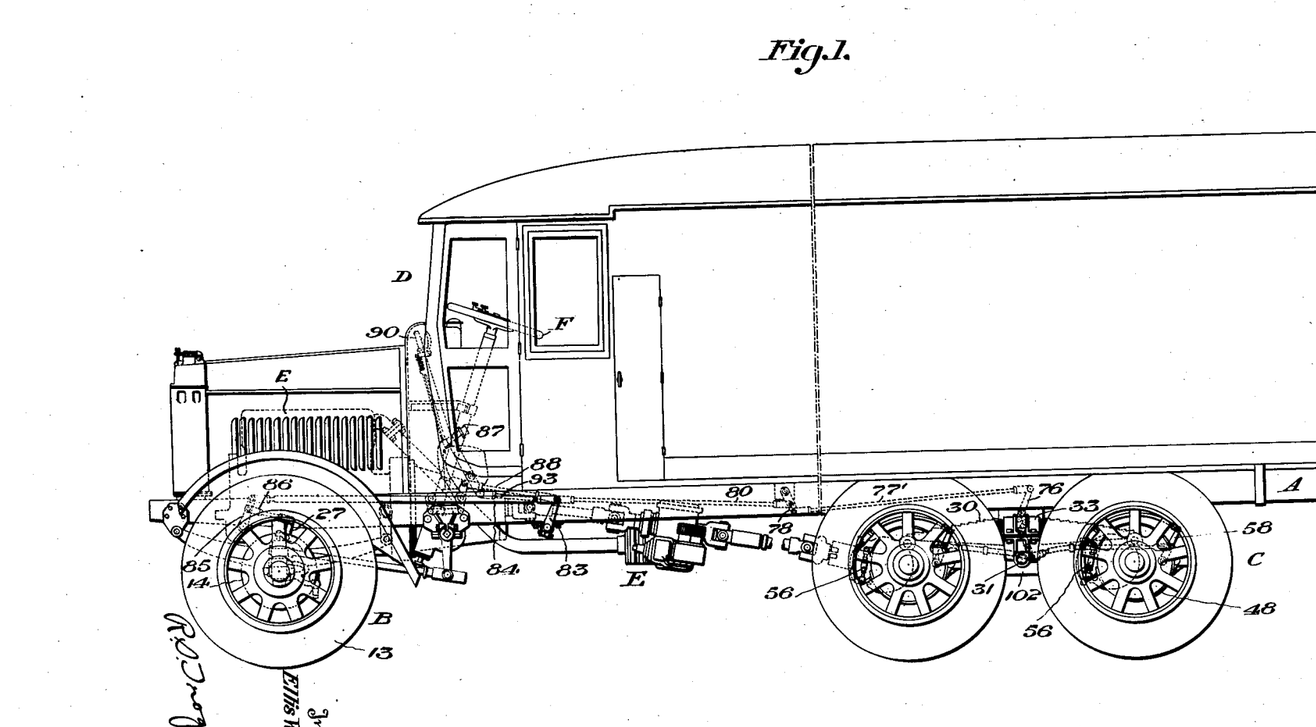
Fig. 1 is a side elevational view illustrating, somewhat diagrammatically, a complete vehicle embodying my running gear.

The body portion D, power unit E, and steering mechanism F, shown in Fig. 1 of the drawing, are merely illustrative of a complete type of vehicle and form, per se, no part of the present invention.

The front steering truck B embodies the usual spring suspended axle 9 provided with yoked ends designated by the numeral 10, and any well known type of steering knuckles 11, upon which wheels 13 are respectively mounted, and which are connected together by means of a rod 12. In accordance with the present invention, however, each wheel 13 is equipped with a suitable brake drum 14 affixed thereto. Also, each steering knuckle is constructed to serve as a mounting for a brake band 15, that is adapted to oscillate therewith for cooperative action at all times with the associated brake drum 14. An assembly of a preferred arrangement of this portion of the braking system is disclosed in Fig. 5 of the drawings, and by reference thereto it will be seen that the band 15 is of the split expansible type arranged to operate internally of the drum 14. A casting 16, preferably formed integrally with the steering knuckle, serves to support a disc 17 upon which the band 15 is mounted. Slotted lugs 18, which are riveted or otherwise affixed to the band 15, are designed to receive studs 19 upon the disc 17, whereby the band is free for movement, with respect to the disc, during its expansive action. To prevent the band 15 from turning on the studs 19, a stop 20 is provided upon the disc 17, to project between the split ends of the band. In this type of brake, a king pin 21, that couples the steering knuckle 11 between the yoked ends of the axle 10, is utilized as a plunger to expand the band 15. As shown by the dotted lines in Fig. 5, the pin 21 projects above and below the axle end, and is normally held in raised position by means of the retractile springs 22. These springs are connected at their upper ends to the disc 17 and at their lower ends to the pin 21. Links 23 connect the split ends of the band 15 to the king pin 21 whereby the band is held from engagement with the drum 14 when the pin 21 is in its raised position. The pin 21 is depressed against the action of the springs 23 by means of a finger 24 which is fixed upon one end of a short shaft 25. The latter element is journalled in a cap casting 26 adapted to be suitably secured upon the upper yoke arm of the axle. A short throw lever 27 is fixed to the opposite end of the shaft 25 whereby the shaft and the finger 24 are rocked, and the king pin is depressed to set the brake through operative connections hereinafter described in detail.

Figure 3:
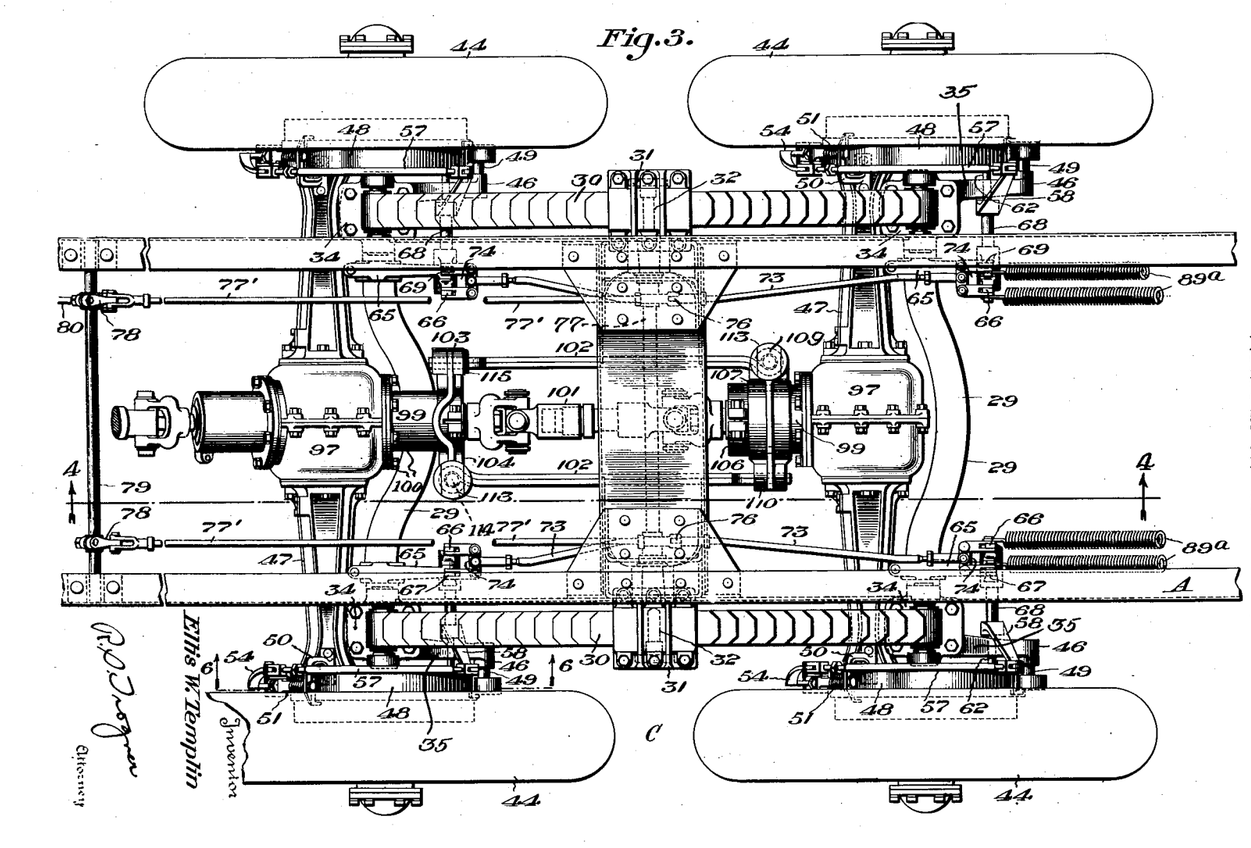
Fig. 3 is a similar view illustrating the rear portion or driving truck of the running gear.
Figure 4:
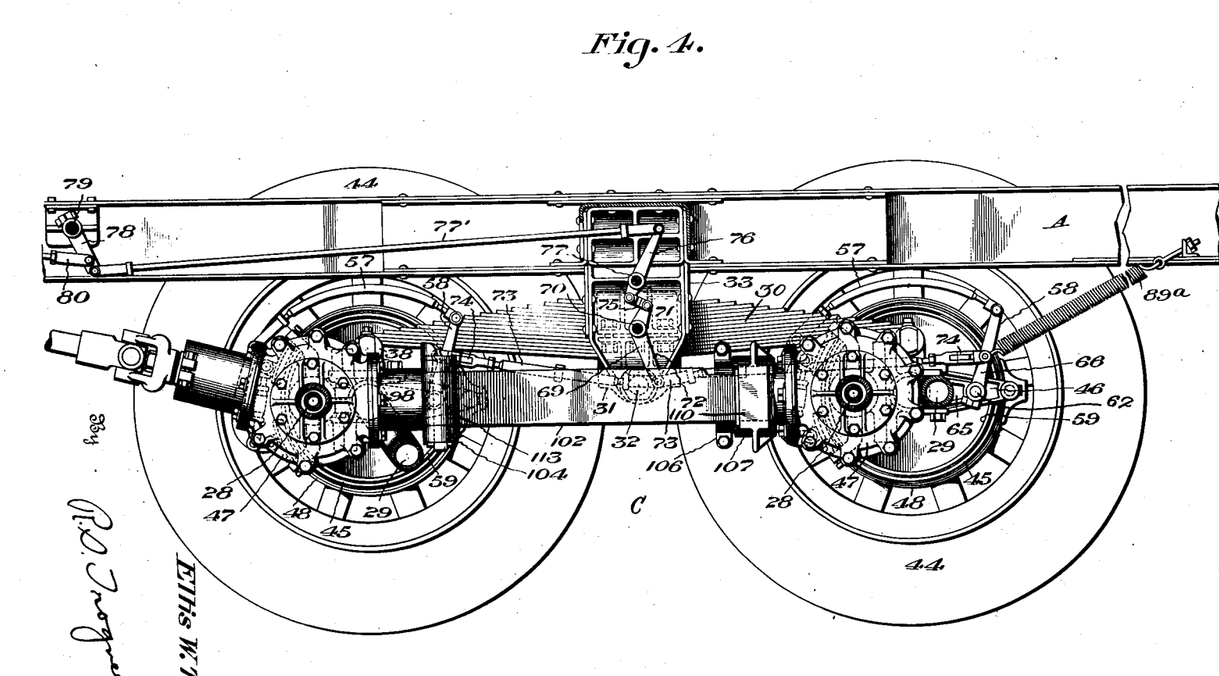
Fig. 4 is a longitudinal sectional view of the structure illustrated in Fig. 3, the section being taken on the line 4—4 thereof.

Referring now to the driving truck C, it will be noted, by reference particularly to Figs. 3 and 4, that, as a unit, it embodies broadly certain principles of the truck of my co-pending application, previously referred to. That is to say, the assembly of mechanisms includes two live axles having their respective housings coupled together by a torque neutralizing mechanism, the axles being connected by springs to the frame A to oscillate about a horizontal axis, and brake mechanisms for each wheel.

The construction of the several elements of the truck, as well as their assembly, is, however, radically different, as will hereinafter be pointed out, attention being directed particularly to the axles, the torque neutralizing mechanism, and the brake actuating devices. For instance, the axles are of the internal gear instead of the worm gear type, and each embodies a live member 28 and a dead wheel carrying member 29. Springs 30, preferably of the semi-elliptic type, connect the wheel carrying members 29 and are provided with suitable clips 31, which are pivotally mounted upon a depending bracket 33, suitably affixed to the frame A, by means of shafts 32. By thus pivoting the clip 31 below the spring, the axis of oscillation of the truck, when it is loaded, is lowered into substantial horizontal alignment with the axis of the axles, as shown in Fig. 4, whereby the action of certain elements of the brake actuating mechanism is facilitated, as will hereinafter become apparent.

Figures 5, 6, 7, 8:
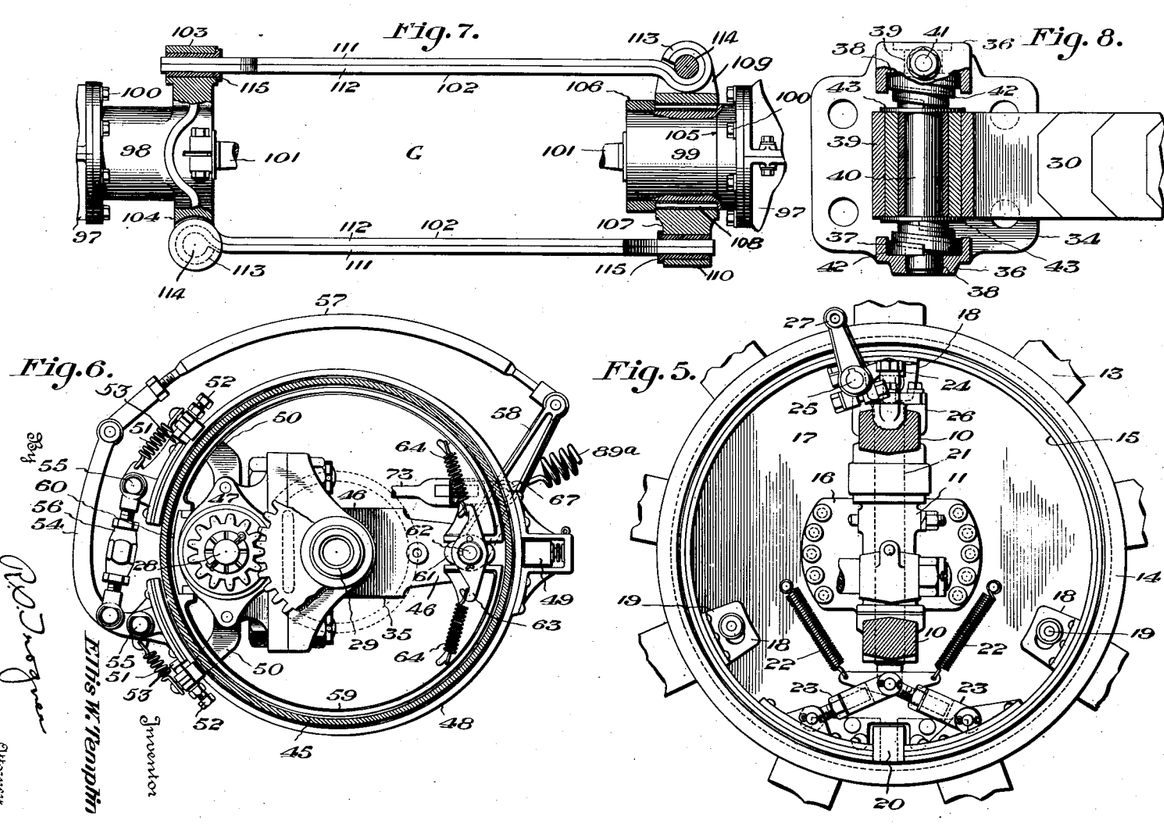
Fig. 5 is a sectional view, with parts shown in elevation, taken on the line 5—5 of Fig. 2, and illustrating in enlarged detail the type of brake mechanism employed in conjunction with the steering wheels.
Fig. 6 is a view partially in section and partially in elevation of the rear braking mechanism shown in Fig. 3, the section being taken along the line 6—6 thereof.
Fig. 7 is a detail view, partially in section and partially in top plan, illustrating the torque neutralizing mechanism.
Fig. 8 is a sectional view illustrating the manner of mounting the spring ends upon the axles.

The respective ends of the springs 30 are secured upon the wheel carrying member 29 in the following manner: Brackets 34, one of which is provided for each spring end, are respectively bolted or otherwise suitably secured to brake carrying members 35, presently described in detail. Each bracket, as shown in Fig. 8, is formed with spaced upstanding ears 36 that are recessed, as indicated at 37, and provided, respectively, with aligned openings 38. The spring end, which is formed with the usual eye 39, is suspended between these ears 36 by means of a bolt or pintle 40 that seats in the openings 38 and is retained therein by suitable means, such as a set screw 41. The ears 36 are spaced a sufficient distance apart to permit lateral play of the spring end therebetween. Telescopic coil springs 42, disposed within the recesses 37, are arranged about each end of the bolt 40 to normally hold the spring end 39 in an intermediate position between the ears 36. If desired, washers 43 may be utilized between the inner end of each coil spring 42 and the face of the spring eye 39. By means of this type of spring support, each wheel carrying member 29, and, as will presently become apparent, its associated live member 28, together with their associated parts, are yieldably mounted for axial movement laterally of the spring ends. Hence, they are free for relative movement axially in opposite directions in rounding curves. Such action advantageously decreases the strain and wear upon the tires, by lessening the force of the end thrust of the axles in making a quick turn, breaking the force of the centrifugal throw of the load, and permitting the wheels to track in different arcs, as will be understood without further description.

The brake carrying members 35, previously mentioned, are mounted respectively upon and adjacent each end of the wheel carrying members 29. The wheels, designated 44, are provided, in this instance, with the usual brake drums 45 affixed thereto, and opening toward their adjacent member 35. Each member 35 comprises a rearwardly extending arm 46, that is designed to support the major portion of the brake mechanism, associated with its adjacent wheel, as will be seen by reference, particularly to Fig. 6.

The remaining elements of the brake mechanism for each wheel are mounted upon the adjacent end of the axle housings 47, one of which is provided for each live axle, all of which will be hereinafter set forth in detail. It will be noted by reference to Fig. 6 that each member 35 is, in effect, a unitary part of the adjacent housing 47.

That portion of the brake mechanism for each wheel 44, that is supported by the arm 46, comprises a split expansible band 48 arranged for frictional engagement externally of its asociated drum 45, and suitably supported upon a post or arm 49 that projects laterally from the arm 46 in the direction of the wheel. The free ends of the band are held against lateral play, by means of guide arms 50 that project from the end of the live axle housing 47, and are normally held from engagement with the drums by tension springs 51, one of which is provided between each arm and its adjacent end of the band. To take up wear in the band and to limit movement of its end, in one direction, set screws 52 are provided in the end of each arm 50 which respectively engage the lugs 53, or similar devices, upon the ends of the band 48. The ends of the band 48 are drawn together, against the drum 45 and against the action of the springs 51, by means of a bell crank lever 54 that is connected at its lower end to one end of the band, as indicated at 55, and to the other end of the band, by a link 56 that is arranged to draw the ends together when the bell crank lever is rocked in a counter clockwise direction. The opposite end of the bell crank lever is pivotally connected by an arcuate link 57 to a throw lever 58 which is mounted and actuated in a manner presently described A second expansible split brake band 59 is arranged interiorly of each drum 45. This band is normally contracted or disengaged from the drum and is mounted upon the end of the axle housing 47, as shown at 60, with its split ends disposed diametrically opposite the split ends of the band 48. A cam 61, fixed upon a rotatable shaft 62, is arranged between the split ends of the band 59 and serves to expand the band upon rotation of the shaft. An arm 63, also fixedly mounted upon the shaft 62, is connected by springs 64 to the band 59 in such manner that the ends of the band are normally drawn together against the face of the cam 61, as illustrated in Fig. 6. The shaft 62 is journalled adjacent its outer portion in the arm 46 of the bracket 35, and at its opposite end is similarly mounted in, and projects beyond, a bracket 65 suitably affixed upon the wheel carrying member 29. An upstanding throw arm 66 is fixed upon the projecting end of the shaft 62 as clearly shown in Figs. 3 and 4, and upon rocking movement in one direction serves to rotate the shaft 62 and cam 61 against the action of the springs 64 to thereby expand the brake band 59 against the drum 45. A similar arm 67 is provided for contracting the band 48 against the drum 45. The latter arm is fixed upon the end of a sleeve 68, which is journalled upon the shaft 62 between the brackets 46 and 65, and upon the opposite end of this sleeve the previously described throw lever 58 is mounted in fixed relation with respect thereto. Obviously, upon rocking movement of the arm 67 in one direction, the throw lever 58 is correspondingly moved to actuate the link 57, crank arm 54 and link 56 to contract the band 48.

From the foregoing, it will be apparent that the brake drums 45 of the wheels 44 of the driving truck C are provided respectively with an internal and an external brake band and devices associated with each band whereby they may be moved individually into braking engagement with the drum by rocking movement in one direction of separate levers 66 and 67. Furthermore, it will now be apparent that the front wheels of the driving truck B are provided, respectively, with a brake drum and an associated brake band adapted to oscillate with the wheel and with normally idle devices upon the axle operable to move the band against the drum by movement, in one direction, of a single rocking lever 27.

According to my invention, all of these levers 27, 66 and 69 are coordinated for simultaneous rocking movement to set all of the brakes, and, with this end in view, the following actuating devices are provided. Bell crank levers 69 are pivotally mounted for swinging movement adjacent each side of the frame A, upon a cross shaft 70. The shaft 70 is journalled at each end in the depending brackets 33 at a suitable point above the axis of oscillation of the truck. Each bell crank is provided with a short arm 71, and a long arm 72, the latter being of sufficient length to bisect, during its movement, the axis of oscillation of the truck. Adjustable reach rods 73 pivotally connect the long arm of each lever 69 respectively to the rocking levers 66 and 67 of adjacent brake mechanisms, the connections of the rods to their respective levers 69 being arranged to move, when the vehicle is loaded, into concentric relation with the axis of oscillation of the truck to set the brakes. Compensating links 74 serve to connect each reach rod with its associated levers 66 and 67 in order that the pull thereon may be equally distributed. The short arm 71 of each lever 69 is connected by a link 75 to the lower end of an actuating lever 76, the latter levers being, in turn, pivotally mounted upon a second cross shaft 77 carried by the brackets 33. Actuating levers 76 are connected respectively at their upper ends by pull rods 77' to depending arms 78 fast upon a jack shaft 79 that is journalled for rocking movement on the frame A. One of the arms 78 is connected adjacent its outer end by a second pull lever 80 to an upstanding rocker arm 81 fast upon a second shaft 82 journalled transversely of the frame A.

The brake mechanisms for the front steering wheels are also connected to the shaft 82 in the following manner. An upstanding arm 83 is affixed upon each end of the shaft 82, these arms being pivotally connected to forwardly extending rods 84. Each of the rods 84 is pivotally connected at its forward end to a rocking lever 85. These latter levers are pivoted respectively adjacent each front wheel upon the frame A and are each connected by a link 86 to the previously described rocker arm 27 of their adjacent brake mechanism. A service foot lever 87, which is pivoted in any suitable manner upon the frame, is connected by means of a link 88 to an upstanding arm 89 fast upon the shaft 82 whereby, when the foot lever is moved forwardly, shaft 82 is rotated in a forward direction and all of the brakes are set, as will be apparent from the foregoing description. Means for returning the previously described brake actuating parts to the position illustrated in the drawings are provided in the form of retractile springs 89ᵃ. As shown in Figs. 3 and 4, one of these springs is provided for each of the levers 66, and 67 of the rear wheel brake mechanism, and are connected at one end to their associated levers and at their respective opposite ends to the frame A.

The foregoing brake mechanism and actuating devices therefor, provide an easily controlled system, whereby, after the brakes are set and the pivotal connections of the rods 73 are moved into axial alignment with the bolts 32, the brakes of each driving wheel maintain their braking action during oscillating movement of the truck about its axis, i. e., the bolts 32, as will be readily understood. Furthermore, any deviation from alignment of the pivotal connections relative to said axis and incident to regulation of the pressure of the brakes, will be so slight that the resultant effect on the brakes of the oscillatory movement of the truck will be negligible.

The front brakes and their actuating devices, it will be noted, provide for equally advantageous operating characteristics, the relative pivotal arrangement of the parts 27, 84, 85 and 86 being such that, when these brakes are set, the throw of the link 86 and lever 27 will not appreciably affect the king pin 21 during movement of the axle and wheel, relative to the frame A.

Figure 2:
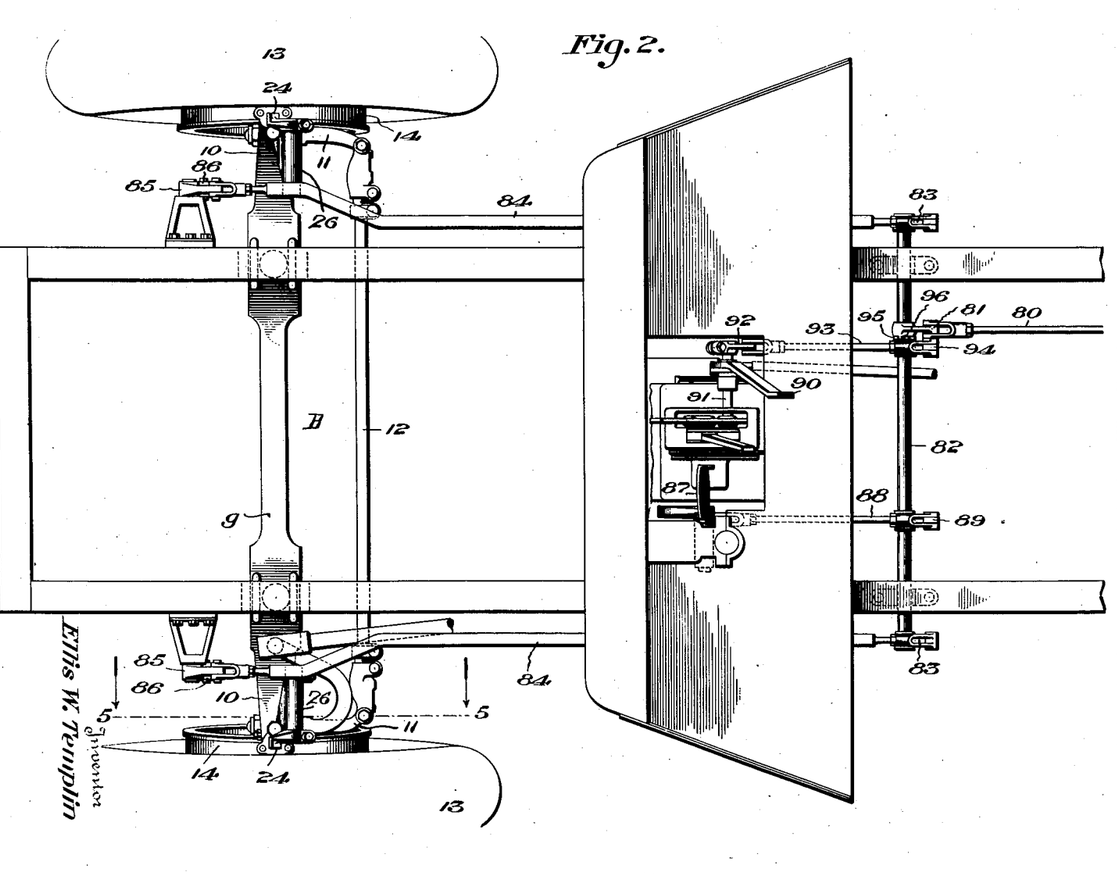
Fig. 2 is a top plan view on an enlarged scale, of the front portion of the running gear.

An emergency operating lever 90 is also provided for actuating shaft 82 to set all of the brake mechanisms either independently of the service lever or to impart additional braking action thereto. Preferably it is mounted in the manner disclosed in Fig. 2 of the drawings upon a shaft 91 that is journalled in any suitable manner upon the frame. At its outer end, the shaft 91 is provided with a fixed upstanding arm 92 which is connected by a link 93 to an upstanding arm 94 journalled upon the shaft 82 in close proximity to the arm 81. Arm 94 is provided with a clutch element 95 adapted to engage a clutch face 96 upon the arm 81 whereby, when the emergency lever is moved rearwardly, the arm 94 will clutch the arm 81 and actuate the shaft 82 to either set the brakes or impart additional braking action to them as previously set forth. The clutch is so arranged, however, that the shaft 82 is free for actuation by the service lever without moving the emergency lever or its connections to said shaft 82.

Referring now to the torque neutralizing mechanism: As before described, each live axle housing 47 is carried by one of the brackets 35 that is mounted upon its associated wheel carrying member and the various brake devices for each wheel are carried respectively upon their adjacent bracket and the end of its associated housing. In order to prevent turning action of these brackets about the axes of their respective members 29, and consequently the various parts carried upon the brackets, and to minimize, in operation, the effect of the various torque strains imposed upon the housings 47, the form of torque neutralizing mechanism, designated generally by the letter G, is utilized. As clearly shown in Figs. 3 and 7 of the drawings, the type of axle housing 47, preferably embodied in my running gear, includes the usual casing 97 designed to enclose the differentials (not shown) of each live axle. Any suitable form of differential may be employed, but inasmuch as they form, per se, no part of the present invention, no showing of them has been included in the drawings. Horizontally arranged bearing sleeves 98 and 99 are respectively secured upon these differential casings 97 by bolts 100. Primarily, these sleeves are provided to serve as bearings for the respective ends of the telescopic driving shaft 101 that couples the differentials together, but, in this instance, they are also utilized as mountings for torque neutralizing members 102 that are disposed upon opposite sides of the shaft 101 and which couple together the axle housings 47. The sleeve 98 which is rigidly mounted upon the housing 97, is provided with laterally projecting ears 103 and 104 that are arranged in diametrically opposite relation, and which serve respectively as supports for the forward end of each of the torque members 102. The sleeve 99 is provided adjacent the casing 97, with a raised shoulder 105, and a locking ring 106 is provided, which is adapted to be clamped around the outer end of the sleeve 99 for a purpose presently apparent. A rotatable annulus 107 is mounted upon the sleeve 99, between the shoulder 105 and the ring 106, and upon roller bearings 108, as clearly shown in Fig. 7 of the drawings. Laterally projecting ears 109 and 110 are likewise provided in diametrically opposite relation upon the annulus 107 and serve to support respectively the rear ends of the torque neutralizing members 102. The torque members 102 each comprise, preferably, a pair of substantially flat resilient bars 111 and 112 so formed as to provide an eye 113 at one end of each member. Each member is pivoted at one end, by means of the eye 113, to swing about a vertical axis upon one of the sleeves, and has its opposite end slidably mounted upon the other sleeve, but their arrangement is reversed upon opposite sides of the shaft. For instance, the eye 113 of one member 102 is pivoted by means of a pintle 114 upon the ear 104 of sleeve 98 while its opposite end is slidably mounted in the ear 110 of annulus 107 whereas member 102 on the opposite side of the shaft is similarly pivoted, by means of a pintle 114, upon the ear 109 of the annulus 107 and has its opposite end slidably mounted in ear 103 of the sleeve 98. Guide sleeves 115 may be provided, if desired, in the ears 103 and 110 for the respective slidable ends of the members.

This type of torque mechanism possesses numerous advantageous features when used in conjunction with the axle construction previously described. For instance, it acts as a reach mechanism extending between the respective housings 47, and adapted to counteract the effects of the driving torque and the traction strains, upon the housings at all times, particularly during oscillation of the truck about its axis. It prevents turning movement of the housings 47 and brackets about the wheel carrying members, thus providing for stability of the brake mechanisms relative to their respective wheels. At the same time, it assures maximum flexibility in a truck of this character in that it permits of relative movement of the driving axles 28 during oscillation of the truck, either on uneven roads, or vice versa. Because of the construction of the torque members 102 and the provision of the rotatable annulus 107, the live axles, and, of course, the axle housings and other parts associated therewith, are free for relative rocking movement about an axis coincident with the axis of rotation of the shaft 101. The live axles are held in place within the housings 47 by conventional bearings. By virtue of the flexiblity and sliding end feature of the members, and their respective pivotal mountings, the live axles and their appurtenances are arranged for movement individually about the pintles 114, and also for movement toward and away from each other during flexing action of the springs 30.

It will now be apparent that my invention comprises a running gear embodying advantageous improvements in various groups of mechanisms that enter into its complete assembly, the various elements thereof being so coordinated that certain groups of elements, for instance, the brake mechanism and the torque neutralizing mechanism, considered each as a unit, influence and assure, respectively, certain positive and effective actions of each other, while at the same time performing their individual functions under normal and abnormal conditions.

Although the foregoing description is necessarily of a detailed character, in order that the invention may be completely set forth, it is to be understood that the specific terminology is not intended to be restrictive or confining, and that various rearrangements of parts and modifications of structural detail may be resorted to without departing from the scope or spirit of the invention as herein claimed.

What I claim is:

1. In a vehicle driving truck, a plurality of driven axles each provided with a housing, and means for neutralizing the torque developed in said housings comprising resilient members so connected to said housings as to prevent rotative movement thereof about the axles and to permit relative movement of the two housings in any other manner.

2. In a vehicle driving truck, a plurality of driven axles each provided with a housing, and means for neutralizing the torque developed in said housings comprising two spaced resilient members, each of said housings having one of said members pivotally connected thereto and being connected in sliding engagement with the other member.

3. In a vehicle driving truck, a plurality of driven axles each provided with a housing, and means for neutralizing the torque developed in said housings comprising a supporting member stationarily secured to one of said housings, a supporting member rotatively secured to the other housing, and resilient torque bars connecting said supporting members, said bars being so disposed as to be resilient in a horizontal plane only.

4. In a vehicle driving truck, a plurality of driven axles each provided with a housing, and means for neutralizing the torque developed in said housings comprising two spaced torque bars pivotally connected to one of said housings and in sliding engagement with the other housing, each of said bars consisting of a plurality of thin relatively wide resilient members disposed in side-by-side relationship.

5. In a vehicle driving truck, a plurality of driven axles each provided with a housing, and means for neutralizing the torque developed in said housings comprising a supporting member stationarily secured to one of said housings, a supporting member rotatively secured to the other housing, and two spaced torque bars of relatively thin wide cross-sectional area, each of said bars being pivotally connected to one of said supporting members by means of a vertically disposed pintle, and in sliding engagement with the supporting member to which the other bar is pivotally connected.

6. In a vehicle driving truck comprising a plurality of live axles and driving connections therebetween the combination with a housing for each axle freely mounted thereon, of torque neutralizing mechanism connecting the housings against individual movement about their axles and comprising spaced resilient members respectively arranged adjacent each side of the driving connection and in parallelism therewith, each of said members being slidably connected to one of said housings to permit limited separational movement of said housings.

7. In a vehicle driving truck comprising a plurality of live axles and driving connections therebetween, the combination with a housing for each axle freely mounted thereon, of torque neutralizing mechanism comprising an element mounted upon one housing for rotation concentrically of the driving connection, and torque bars connecting the rotatable element to the opposite housing, said bars being arranged to permit relative movement of the housings toward and away from each other.

8. In a vehicle driving truck comprising a plurality of live axles and driving connections therebetween, the combination with a housing for each axle freely mounted thereon, of torque neutralizing mechanism embodying an element mounted upon one housing for rotation concentrically of the driving connection, and torque bars having their ends mounted respectively upon the element and the opposite housing, each bar being mounted at one end for sliding movement axially of said connection and at its other end for movement about an axis normal to the major axis of said connection.

9. In a vehicle driving truck comprising a plurality of live axles and driving connections therebetween, the combination with a housing for each axle freely mounted thereon, of torque neutralizing mechanism embodying an element mounted upon one housing for rotation concentrically of the driving connection, and spaced torque bars arranged in parallelism with said connection and in diametrically opposite relation with respect thereto with their ends mounted respectively on said element and the opposite housing, each bar being mounted at one end for sliding movement axially of said connection and at its opposite end for movement about an axis normal to the main axis of said connection.

10. A motor vehicle chassis comprising a frame, two pairs of rearwardly located road-engaging wheels, axles for said wheels, housing for said axles, supporting springs extending between said housings and pivotally connected directly to each housing and to the frame, and torque neutralizing mechanism connecting said housings and comprising spaced resilient members arranged on opposite sides of a vertical plane connecting the longitudinal centers of the housings, each of said members being pivotally connected to one of the housings to swing about a vertical axis relative thereto, and slidably held at its other end in a sleeve associated with the other housing.

11. A motor vehicle chassis comprising a frame, two pairs of rearwardly located road-engaging wheels, axles for said wheels, housings for said axles, supporting springs extending between said housings and pivotally connected to each housing, each of said supporting springs being pivotally connected to said frame, and torque neutralizing mechanism connecting the housings comprising a swivel sleeve mounted on one housing and adapted to turn about a horizontal axis at right angles to the axis of the housing, a pair of spaced parallel flat or spring members positioned on edge to permit flexibility in a horizontal direction and relatively great stiffness in a vertical direction, one of said bars being pivotally connected to one of said housings to swing about a vertical axis, a supporting sleeve formed in said swivel sleeve adapted to receive the other end of said spring member and permit longitudinal movement of the member in the sleeve, the other bar member being pivotally connected to said swivel sleeve to swing about a vertical axis substantially parallel with the aforesaid vertical axis, and a supporting sleeve formed in the other housing adapted to slidably receive the other end of the last named bar member.

In witness whereof I have hereunto signed my name.

ELLIS W. TEMPLIN.